INVENTORS
PHILIP J. COSTA
ROBERT G. MILLER

United States Patent Office 3,536,970
Patented Oct. 27, 1970

3,536,970
FREQUENCY SUMMING CONTROL CIRCUIT
Philip J. Costa, Chillicothe, and Robert G. Miller, Princeville, Ill., assignors to Caterpillar Tractor Co., Peoria, Ill., a corporation of California
Filed Mar. 7, 1968, Ser. No. 711,354
Int. Cl. H02p 5/38
U.S. Cl. 318—227                                          5 Claims

ABSTRACT OF THE DISCLOSURE

An electro-mechanical control circuit algebraically sums in a polyphase output signal several rotational frequencies by amplitude-modulation of a carrier frequency with one of the rotational frequencies, coupling the resulting amplitude-modulating carrier frequency to a primary of a synchro-differential transformer, and rotating the primary proportionally to the second rotational frequency whereby an output signal is introduced into the secondary of the synchro-differential, which, when demodulated, is an algebraic polyphase sum of the separate rotational frequencies. This sum can be employed to control the rotational speed of polyphase electric drives by driving the primary of the synchro-differential transformer at a speed proportioned to the selected speed and torque by using the algebraic sum to control switch means for each phase between drive motor and its power source.

BACKGROUND OF THE INVENTION

The present invention relates to an electromechanical means for providing the algebraic sum of several rotational frequencies in a polyphase output signal. The term "polyphase" is used to refer to signals having at least two phases and a single frequency, such as a 60-cycle, three-phase line source. More particularly, the system is designed primarily to accept several rotational frequencies and supply a polyphase output signal equal to the algebraic sum of the input rotational frequencies which can be used to control each phase of an electric drive which provides one of the rotational frequencies summed in the circuit.

The problem of providing the algebraic sum of two rotational frequencies arises in many industrial applications and, in some cases, the frequencies must be summed with a high degree of accuracy. For example, when it is desired to control the speed, torque and direction of an alternating current induction motor, it is necessary to algebraically add a frequency proportional to the rotational speed of the motor and a variable rotational frequency representing the slip frequency of the motor. Since slip frequency is small compared to the rotational frequency, the algebraic sum of these two frequencies will be only slightly different than the actual rotational frequency of the motor. For example, in a conventional three-phase, two-pole A.C. induction motor, operating from a 60 cycle source, the rotational frequency will be 60 c.p.s. minus the slip frequency of a few c.p.s. Since the slip frequency is only a few c.p.s., any summing circuit must supply an output signal that is accurate to a small fraction of a c.p.s. if accurate control of motor speed, torque, and direction, is to be achieved.

In the past, various systems have been designed to provide the algebraic sum of two input rotational frequencies but have not proven entirely satisfactory where an accurate sum is required. For example, electronic circuits have been used to provide an output signal that contains both the sum and difference of the two input rotational frequencies. Conventionally the sum and difference signals are then separated by the use of wave traps or filters that eliminate the unwanted portion of the signal. Normally this is not a difficult problem, providing the difference between the sum and the difference frequencies is comparatively large. However, in the cases where the difference in frequencies is small, for example, in the range of a fraction to a few cycles per second, it is impossible to design wave traps or filters capable of eliminating the unwanted signal. Additional filtering merely tends to attenuate the desired signal to such an extent that it is substantially useless. Obviously, in the case of an A.C. motor control, where the slip frequency may be only a few cycles per second even under full-load, conventional electronic devices cannot provide a satisfactory algebraic sum of the rotational and slip frequencies.

Also, attempts have been made to provide electromechanical devices for summing the two signals, which are more related to the instant invention. Such devices have normally included a synchro-differential transformer in which the primary of the transformer is driven at the speed of the motor and secondary of the transformer is held stationary. Usually the secondary of the transformer is then supplied with a carrier frequency which in turn is modulated by both the rotating primary of the transformer as well as by the slip frequency. The modulated output signal is then used as a control signal. These systems do provide the algebraic sum of the signals but the output signal is a single phase signal and while it is possible to use a single phase signal to control a polyphase motor, the required controls become complex and complicated.

U.S. Pats. Nos. 3,144,594, 3,144,595, 3,144,596 and 3,151,915 issued to T. D. Graybeal are illustrative of related prior art motor control circuits of the general type described above.

Accurate control of the speed, torque and direction of A.C. induction motors, preferably needs a control signal with the same number of phases as the drive motor. With a polyphase control signal, each phase of the motor can be separately controlled. In a typical installation, an induction motor is powered by a three-phase, 60-cycle line source and can employ a solid state frequency changer controlled by the polyphase control signal to vary the frequency supplied to the motor. The solid state frequency changer may be a plurality of silicon controlled rectifiers whose firing cycle is controlled through the control signal to provide a fabricated sinusodial wave form. Generally, it is preferable in a three-phase system to use both positive and negative phases of the polyphase control signal for controlling the firing of the silicon controlled rectifiers. Such a system will provide accurate control of the speed, direction and torque of an induction motor.

SUMMARY OF THE INVENTION

The present invention is suitable for providing an electro-mechanical system producing an accurate algebraically polyphase sum of several rotational frequencies which can be employed in motor control operations. More particularly, the invention utilizes a motor speed transducer that supplies a frequency proportional to the speed of the motor. This amplitude-modulated signal, which is a polyphase signal, is then supplied to a plurality of primary windings on a synchro-differential transformer. The transformer primary is physically rotated at a speed proportional to a slip frequency for the drive motor being controlled. The stationary secondary of the synchro-differential is coupled to a demodulating circuit where the amplitude-modulated signal is demodulated to a polyphase output control signal.

By rotating the primary at a slip frequency, the amplitude-modulated polyphase signal representing the actual speed of the motor will be algebraically summed with the slip frequency, with the sum being supplied to the secondary. The primary can be rotated in either direction, so if the primary is rotated in the same direction as the field, the slip frequency will be added, while it is subtracted if the primary is rotated opposite to the field. If the slip frequency is reduced, the induction motor of course will operate as an induction generator until a decrease in the speed or reverse in direction of the drive motor has been effected.

The polyphase output control signal can be used in a solid state frequency converter. More particularly, since the same number of phases are present in the control signal as phases in the drive motor, the signals may be used as a direct control of the solid state frequency converter, such as a cyclo-converter. This eliminates the necessity of utilizing complicated controls to phase shift the control signal as is the case where only a single-phase control signal is available.

BRIEF DESCRIPTION OF THE DRAWINGS

The above advantages of this invention will be more easily understood from the following detailed description of a preferred embodiment when taken in conjunction with the attached drawings in which.

BRIEF DESCRIPTION OF AN EMBODIMENT

Figure 1:
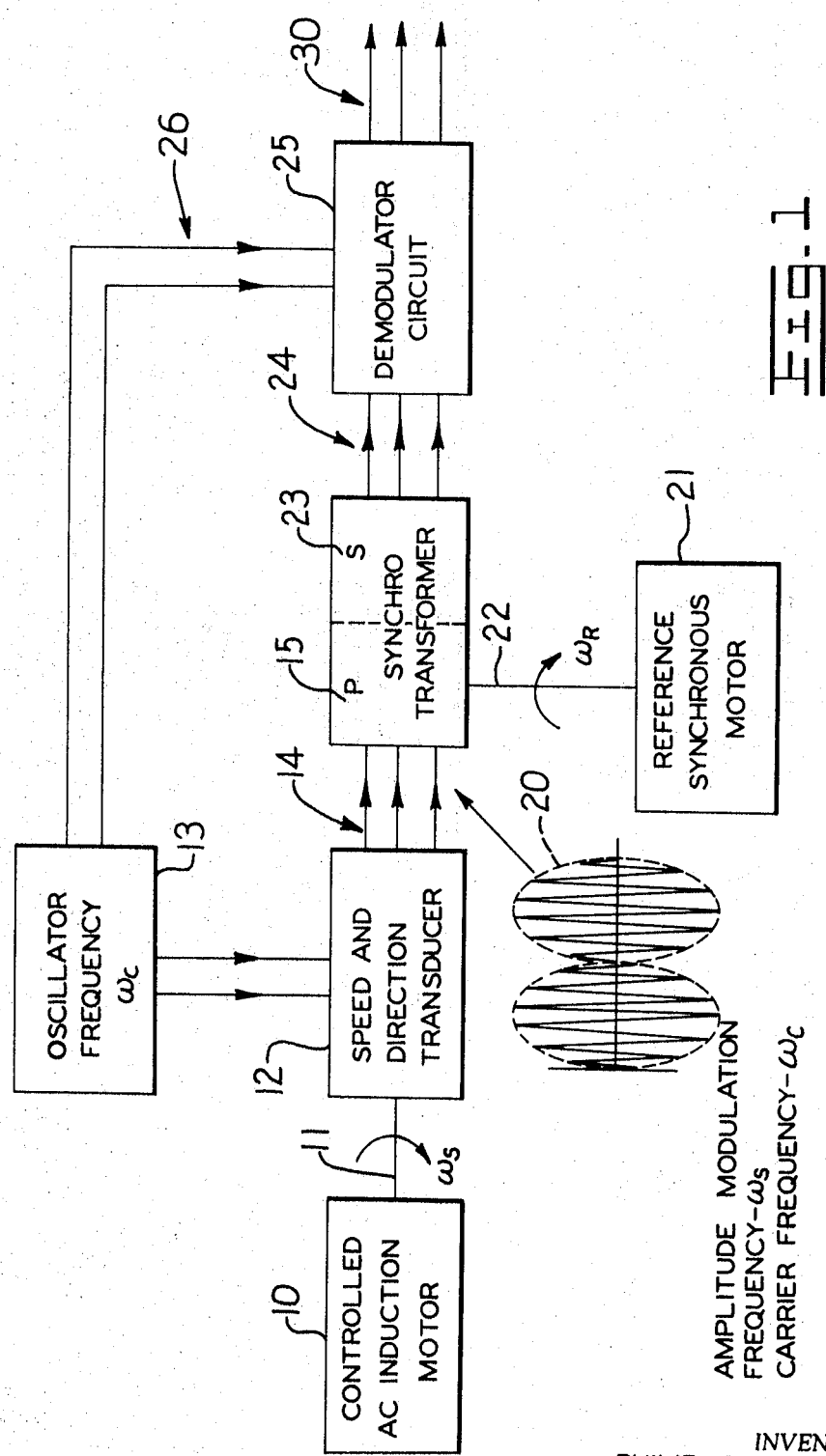
FIG. 1 is a block diagram of a system constructed in accordance with this invention.

Referring to the block diagram shown in FIG. 1, a drive motor 10 is controlled by a circuit employing the algebraic sum of its rotational and a slip frequency. The motor is preferably an A.C. drive motor and is illustrated in FIG. 1 as an A.C. induction motor. The motor output shaft 11 is mechanically coupled to a speed and direction transducer 12 so it directly drives the speed and direction of the rotor in the transducer. The rotor windings of the transducer are excited by a carrier frequency oscillator 13 so the rotation of the rotor modulates the oscillator frequency proportioned to its speed. The speed transducer preferably should be provided with the same number of poles as the drive motor and a 1:1 drive so that the modulated output signal will be directly proportioned to the rotational frequency of the drive motor.

For example, if both the drive motor and speed transducer are four-pole machines, the rotational frequency will be twice the actual rotational speed of the motor. A suitable speed transducer is disclosed in co-pending application entitled, Brushless Direction and Speed Sensing Transducer, Ser. No. 593,064, filed Nov. 9, 1966, now U.S. Pat. 3,445,697, and assigned to the same assignee as this invention. Reference is made to that co-pending application for disclosure of and operation of the transducer, which is incorporated herein by reference. This type of speed transducer can be excited from a 10,000 Hz. power supply. While it is preferred that speed transducers have the same number of poles as the motor, it may have a different number. However, if the number of poles are different, gearing can be used to effectively match the number of poles mechanically or the two units may be matched electronically.

The speed transducer supplies the polyphase amplitude-modulated signal over the leads 14 to the three-phase primary 15 of a synchro-differential transformer. For example, if the drive motor is a conventional three-phase motor, the speed transducer will supply a three-phase modulated signal on the leads 14. The modulated signal will be an amplitude-modulated signal with each phase having a wave form similar to that illustrated in the wave form 20 of FIG. 1. Of course, there will be 120 electrical degrees between the three phases.

The primary of the synchro-differential is designed to be rotated in either direction. If the primary remains stationary, the synchro-differential acts as a 1:1 transformer and the output frequency of the secondary 23 will be exactly equal to the input rotational frequency of the transducer. If the primary is rotated in a direction opposite to the rotation of the field of the primary, the signal induced in the secondary will be equal to the input rotational frequency minus the rotational frequency of the primary. Similarly, if the primary is rotated in the same direction as the field of the primary, the signal induced in the secondary will be equal to the input rotational frequency plus the rotational frequency of the primary. The primary is rotated by a reference, oscillator controlled, synchronous motor 21 which is mechanically coupled to the primary by means of the shaft 22. The speed of the synchronous motor is controlled either manually or automatically by changing the oscillator frequency. A D.C. control motor could also be used in place of the synchronous motor and controlled with a speed and direction control circuit.

The output of the secondary 23 of the synchro-differential is coupled by means of the leads 24 to a demodulating circuit 25. The demodulating circuit is also supplied with the reference frequency from the oscillator 13 over the leads 26 and may be a conventional diode type of demodulator that provides an output signal equal to the amplitude modulation of the input signal.

Figure 2:
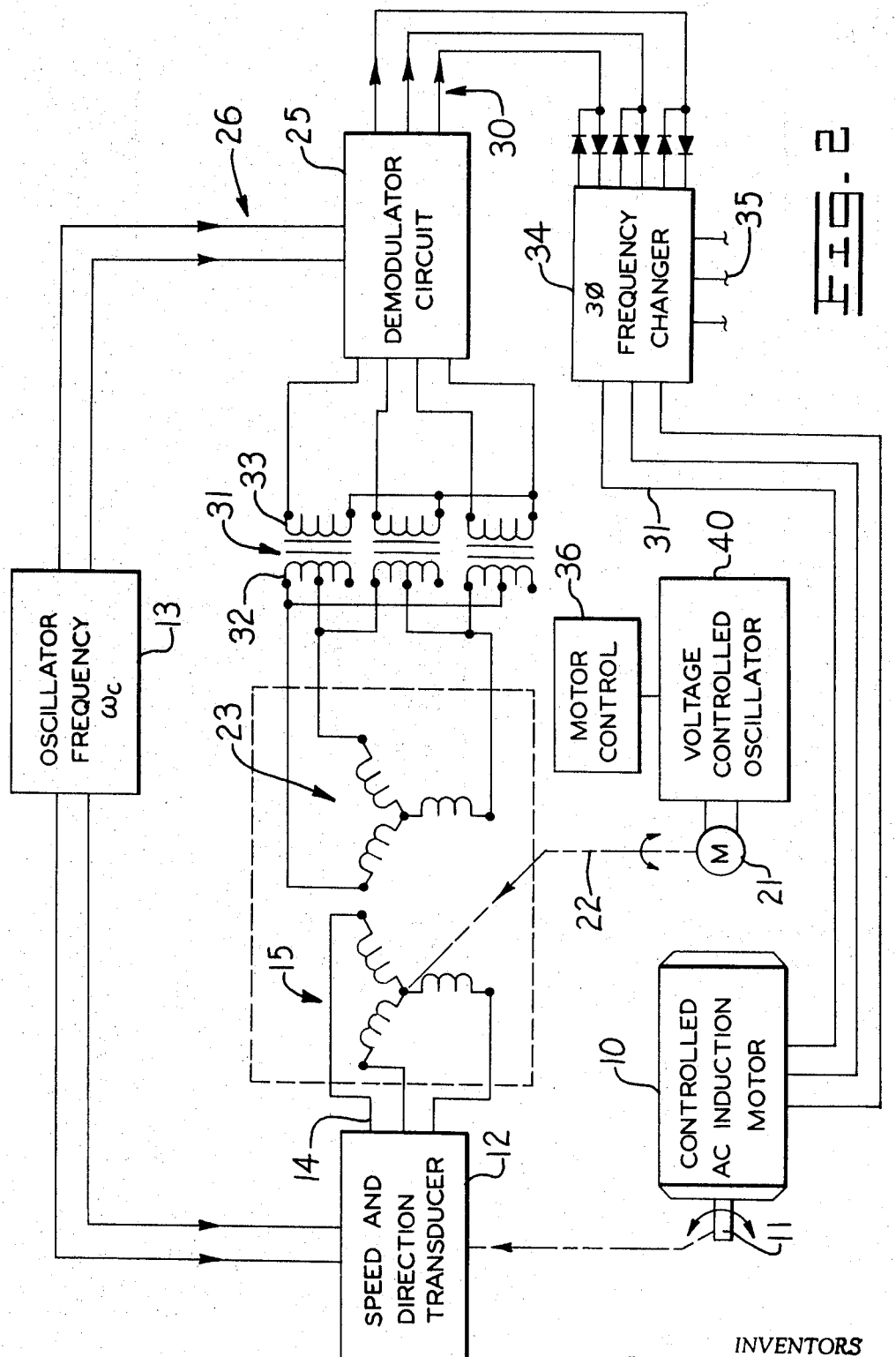
FIG. 2 is a schematic circuit showing the means for obtaining the algebraic sum of the two input frequencies.

Referring now to FIG. 2, the details of the synchro-differential transformer and the controls for the drive motor 10 are shown. Elements corresponding to those shown in FIG. 1, are designated with the same numerals in FIG. 2. The drive motor drives the speed transducer 12 to modulate the oscillator frequency to supply an amplitude-modulated polyphase signal to the primary 15 of the synchro-differential. The primary of the synchro-differential is driven by the reference motor 21 that is mechanically coupled to drive the primary through the shaft 22. As shown, the primary and secondary of the syncho-differential are three-phase Y-connected windings. The reference motor 21, when an A.C. synchronous motor, is controlled by a voltage controlled oscillator 40 whose frequency may be varied manually, or automatically and in a programmed pattern. Normally, the reference motor will rotate the primary of the synchro-differential at a speed equal to the slip frequency of the drive motor when the latter is at a selected constant speed. The slip frequency will, of course, be related to the frequency of the power supplied to the drive motor. As explained above, the primary of the synchro-differential induces a signal in the secondary 23 which is equal to either the rotational frequency of the drive motor plus a slip frequency or the rotational frequency minus a slip frequency.

The synchro-differential is a conventional three-phase Y-connected circuit and the transformer 31 is used to convert the Y connection into a four-wire common ground system. More particularly, the secondary is coupled to the primary 32 of the transformer 31 in a delta configuration, while the secondary of the transformer 31 is coupled in the conventional four-wire common ground system. Thus, the transformer 31 in addition to converting the three-wire synchro-differential to a four-wire common ground output, also amplifies the output voltage of the synchro-differential. The transformer is coupled to the demodulating circuit 25 which also receives the oscillator frequency over leads 26. As explained above, the demodulator can be a conventional diode demodulating circuit that supplies a three-phase output on leads 30. The three-phase output is the amplitude-modulation of the input signal whose frequency is proportional to the rotational frequency of the drive motor plus or minus a slip frequency. In addition, the demodulator preferably has diodes disposed in its output so that it can supply both the positive half cycles and negative half cycles of the output frequency.

The demodulated output frequency is supplied over the leads 30 to a frequency changer 34. The frequency changer may be a solid-state converter in which a plurality of silicon-controlled rectifiers are used to supply synthesized output frequency. In this case the output signals of the demodulator would be used to control the firing circuits of the silicon-controlled rectifiers. The frequency changer is powered by a constant frequency supply 35 (not shown) having a frequency greater than the highest desired frequency from the changer 34. The frequency changer is coupled by the leads 31 to the drive motor 10.

The speed and direction of rotation of the reference motor 21 may be controlled by controlling its power supply. This can be done by means of a motor control 36 that may be a programmed control unit or a manual control for controlling the voltage controlled oscillator 40.

The above described summing circuit can be used in combination with a control system to obtain any desired speed-torque response from a drive motor, within any capacity.

A control system can be employed which generates a programmed speed control signal and compares the control signal with the instantaneous speed of the drive means to generate an error signal. The error signal is used to correct the speed of the drive motor. In the system of this invention the error signal is used to control the speed and direction of reference motor 21 that drives the primary of the synchro-differential.

The above description of the control system of this invention is related to A.C. motor control although the invention may also be applied to a D.C. motor. In the case of a D.C. motor the output frequencies from the demodulator circuit would be used to control a variable voltage power supply. The variable voltage supply could comprise a solid state supply using silicon-controlled rectifiers whose firing cycles are controlled by the output frequencies from the demodulator.

OPERATION

Referring to FIGS. 1 and 2, the above-described control system will supply a polyphase output control signal whose frequency is equal to the rotational frequency of a motor plus or minus a slip frequency algebraically added by the reference motor 21. Control of the reference motor adjusts the slip frequency and the drive motor changes speed or direction accordingly because of the frequency or phase sequence change in its power source. The rotational speed of the drive motor is converted to an amplitude-modulated signal having the same number of phases as the motor. As explained, this can be accomplished by using a speed transducer with the same number of poles as the motor, a 1:1 drive and exciting the field of the rotor of the transducer with a $10^4$ Hz. signal. Thus, the output of the speed transducer, in the case of a three-phase power supply will be a three-phase amplitude-modulated signal whose frequency is proportional to the rotational frequency of the motor. The transducer output signal is supplied to the three-phase primary or rotor of the synchro-differential. The rotation of the primary is controlled by a reference motor that is controlled either manually or automatically.

The direction and speed of rotation of the primary of the synchro-differential will depend upon the desired direction and speed operation of the drive motor. For example, if it is desired to maintain the speed and torque of the drive motor at its present operating level, the primary must be rotated in a direction so the amplitude-modulated signal at the speed is equal to the slip frequency of the drive motor. Similarly, if it is desired to increase either the speed or the torque of the motor, the primary must be rotated in the same direction at a speed greater than the present slip frequency of the motor. Likewise, to decrease the speed and torque of the motor, the primary is rotated slower or in the opposite direction. The output signal of the synchro-transformer is supplied to a demodulating circuit which supplies a three-phase output control signal. The output control signal of the demodulating circuit can be used to control the power supply of the drive motor. Since the demodulator circuit supplies a signal having the same number of phases as the drive motor, each phase of the signal can be used to control one phase of the power input to the drive motor. Thus, substantially direct control between the algebraic summing circuit of the present invention and the control system can be provided. This eliminates the need for an elaborate switching and logic for controlling the power supplied to the drive motor. In addition, through the above controls the control 36 provides a simple means by which the speed, direction and torque of the drive motor may be continuously and accurately controlled.

Since speed control is effected by control of the reference motor 21 which drives the primary of the synchro-differential, it can be relatively small since it is unaffected by the torque requirements on the drive motor. Alternatively, if the reference is a D.C. motor, the motor control may be a variable resistance including means for reversing the direction of current flow to the motor.

The voltage source 35 can be a high frequency three-phase voltage source, 60 c.p.s. plus. A 400 cycle A.C. supply will allow a greater speed range to be employed since the cyclo-convertor must generate a frequency less than the source frequency. Alternatively the three-phase frequency changer could be three solid state invertors (D.C. to A.C.) whose output frequencies are controlled by the polyphase sum signal, so that any desired frequency for the drive motor can be directly generated rather than fabricated from an existing frequency.

Using the three-phase control signal the drive motor can be dynamically braked more efficiently than can be accomplished by conventional "plugging." This makes the instant control system superior to prior art devices, especially where precise speed control is desired.

What is claimed is:

1. A control apparatus for controlling the speed, direction and torque of an A.C. induction from an A.C. power source comprising:
  an oscillator providing a stable carrier frequency output;
  a transducer having a rotor and a stator, said rotor having a winding thereon energized by said carrier frequency output of said oscillator and drivingly coupled to the output shaft of said A.C. induction motor and operable to induce an amplitude modulated signal in said stator;
  a synchro-differential transformer having a rotatable primary and a stationary secondary, said primary connected to said stator and energized by said amplitude modulated signal and drivingly connected to a control motor which can be adjusted accurately in speed and direction;
  control circuits for controlling the speed and direction of said control motor; and
  a frequency changer connected to said stationary secondary of said synchro-differential transformer and between said A.C. power source and said A.C. induction motor whereby said frequency of said A.C. power source is varied to achieve a selected speed, torque and direction of said A.C. induction motor by utilizing the output from said stationary secondary of said synchro-differential transformer.

2. The control apparatus as defined in claim 1 wherein a demodulator having an input from the source means is connected between the secondary of the synchro-differential transformer and the frequency changer means whereby the frequency changer means receives the demodulated output signal.

3. The control apparatus as defined in claim 1 wherein the transducer means has the same number of poles as the electric motor being controlled and the transducer rotor is driven at a 1:1 ratio.

4. The control apparatus as defined in claim 3 wherein the electric motor being controlled is a polyphase induction motor.

5. The control apparatus as defined in claim 3 wherein the control motor is an A.C. synchronous motor and the control circuit includes a controllable oscillator for changing speed or direction of said synchronous motor.

References Cited

UNITED STATES PATENTS

| | | | |
|---|---|---|---|
| 3,188,482 | 6/1965 | Woodworth | 318—28 |
| 3,323,032 | 5/1967 | Agarwal et al. | 318—231 |
| 3,443,184 | 5/1969 | Lemmrich | 318—227 |

ORIS L. RADER, Primary Examiner

K. L. CROSSON, Assistant Examiner

U.S. Cl. X.R.

318—231

PO-1050
(5/69)

UNITED STATES PATENT OFFICE
CERTIFICATE OF CORRECTION

Patent No. 3,536,970                    Dated October 27, 1970

Inventor(s)    P. J. Costa et al

It is certified that error appears in the above-identified patent and that said Letters Patent are hereby corrected as shown below:

Claim 1, line 2, after "induction" insert --motor--

SIGNED AND SEALED
MAR 9 1971

(SEAL)
Attest:

Edward M. Fletcher, Jr.
Attesting Officer

WILLIAM E. SCHUYLER, JR.
Commissioner of Patents